(12) United States Patent  (10) Patent No.: US 9,128,878 B2
Lambert et al.  (45) Date of Patent: *Sep. 8, 2015

(54) SYSTEM AND METHOD FOR AUTO-FAILOVER AND VERSION MATCHING OF BOOTLOADER IN AN ACCESS CONTROLLER

(71) Applicant: Dell Products L.P., Round Rock, TX (US)

(72) Inventors: Timothy M. Lambert, Austin, TX (US); Brian L. Brelsford, Austin, TX (US); Elie Jreij, Pflugerville, TX (US); Wade Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/092,746

(22) Filed: Nov. 27, 2013

(65) Prior Publication Data

US 2014/0089655 A1 Mar. 27, 2014

Related U.S. Application Data

(63) Continuation of application No. 13/026,340, filed on Feb. 14, 2011, now Pat. No. 8,627,141.

(51) Int. Cl.
*G06F 11/14* (2006.01)
*G06F 9/44* (2006.01)
*G06F 11/16* (2006.01)

(52) U.S. Cl.
CPC .......... *G06F 11/1417* (2013.01); *G06F 9/4416* (2013.01); *G06F 11/1666* (2013.01)

(58) Field of Classification Search
CPC G06F 11/1417; G06F 11/1666; G06F 9/4416
See application file for complete search history.

(56) References Cited

U.S. PATENT DOCUMENTS

| 7,024,581 | B1 | 4/2006 | Wang et al. |
| 7,292,535 | B2 | 11/2007 | Folkes et al. |
| 7,313,685 | B2 * | 12/2007 | Broyles et al. ..................... 713/2 |
| 7,340,638 | B2 * | 3/2008 | Nicholson et al. ........... 714/6.11 |
| 7,594,135 | B2 | 9/2009 | Gonzalez et al. |
| 7,962,777 | B2 | 6/2011 | Gonzalez et al. |
| 7,975,178 | B2 * | 7/2011 | Kim et al. ........................ 714/36 |
| 8,260,891 | B2 * | 9/2012 | Abels et al. ................... 709/222 |
| 8,627,141 | B2 * | 1/2014 | Lambert et al. .................. 714/15 |
| 8,639,964 | B2 * | 1/2014 | Berke et al. ........................ 714/3 |
| 2003/0012114 | A1 | 1/2003 | Larvoire et al. |

(Continued)

*Primary Examiner* — Nadeem Iqbal
(74) *Attorney, Agent, or Firm* — Baker Botts L.L.P.

(57) ABSTRACT

In accordance with embodiments of the present disclosure, an information handling system may include a processor and an access controller communicatively coupled to the processor. The access controller may include a memory having a bootloader portion including a first memory address and a second memory address a second processor communicatively coupled to the memory. The second processor may be configured to: (i) attempt to execute the a first copy of a bootloader stored at the first memory address; (ii) in the event of a failure to execute the first copy of the bootloader, copy a second copy of the bootloader stored at the second memory address to the first memory address; and (iii) subsequent to copying the second copy to the first memory address, attempt to execute the second copy of the bootloader stored at the first memory address.

20 Claims, 2 Drawing Sheets

(56) References Cited

U.S. PATENT DOCUMENTS

| | | |
|---|---|---|
| 2004/0153724 A1* | 8/2004 | Nicholson et al. .................. 714/6 |
| 2006/0020845 A1* | 1/2006 | Broyles et al. .................... 714/2 |
| 2006/0236150 A1 | 10/2006 | Lintz, Jr. et al. |
| 2007/0180206 A1 | 8/2007 | Craft et al. |
| 2008/0005611 A1* | 1/2008 | Solyanik .......................... 714/6 |
| 2008/0209262 A1* | 8/2008 | Maity et al. ....................... 714/6 |
| 2009/0254776 A1 | 10/2009 | Gonzalez et al. |
| 2011/0093956 A1 | 4/2011 | Laarakkers et al. |

* cited by examiner

SYSTEM AND METHOD FOR AUTO-FAILOVER AND VERSION MATCHING OF BOOTLOADER IN AN ACCESS CONTROLLER

CROSS-REFERENCE TO RELATED APPLICATIONS

This application is a continuation of pending U.S. patent application Ser. No. 13/026,340 filed Feb. 14, 2011; the contents of which is incorporated herewith in its entirety by reference.

TECHNICAL FIELD

The present disclosure relates in general to information handling systems, and more particularly to auto-failover and version matching of a bootloader in an access controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of access controllers in information handling systems has increased in recent years. Broadly speaking, an access controller may be thought of any device, system, or apparatus configured to permit an administrator or other person to remotely monitor and/or remotely manage an information handling system, oftentimes via an "out-of-band" management communications channel physically isolated from the "in band" communication channel used for non-management communications. An access controller may include or be an integral part of a baseboard management controller, a Dell Remote Access Controller (DRAC) or an Integrated Dell Remote Access Controller (iDRAC).

Thus, an access controller may in essence be a special-purpose information handling system embedded in a larger general-purpose information handling system. As such, an access controller may also be configured to execute an operating system to facilitate its remote management functionality. Like many information handling systems, an access controller may include a specialized program of executable instructions known as a bootloader configured to initialize hardware for use with an operating system and load the operating system for execution.

From time to time, events may occur that cause corruption of bootloader or operating system code in an access controller, thus negatively affecting usability of an access controller. In some cases, a corruption may render an access controller completely unusable for its intended purpose of remote management, thus leading to poor user experience.

In addition, bootloaders and operating systems are becoming increasingly interdependent (e.g., bootloaders and operating systems may pass numerous variables and parameters to each other), thus meaning that it has become increasingly important that an operating system residing on an access controller remain in sync with a compatible version of an associated bootloader stored on the access controller. Also, in some cases, it is critical that when updated, a bootloader only be replaced with the same or newer version of the bootloader.

SUMMARY

In accordance with the teachings of the present disclosure, the disadvantages and problems associated with failure of a bootloader and/or an operating system in an access controller have been reduced or eliminated.

In accordance with embodiments of the present disclosure, an information handling system may include a processor and an access controller communicatively coupled to the processor. The access controller may include a memory having a bootloader portion including a first memory address and a second memory address a second processor communicatively coupled to the memory. The second processor may be configured to: (i) attempt to execute the a first copy of a bootloader stored at the first memory address; (ii) in the event of a failure to execute the first copy of the bootloader, copy a second copy of the bootloader stored at the second memory address to the first memory address; and (iii) subsequent to copying the second copy to the first memory address, attempt to execute the second copy of the bootloader stored at the first memory address.

In accordance with additional embodiments of the present disclosure, an access controller may include a memory having a bootloader portion including a first memory address and a second memory address and a processor communicatively coupled to the memory. The processor may be configured to: (i) attempt to execute the a first copy of a bootloader stored at the first memory address; (ii) in the event of a failure to execute the first copy of the bootloader, copy a second copy of the bootloader stored at the second memory address to the first memory address; and (iii) subsequent to copying the second copy to the first memory address, attempt to execute the second copy of the bootloader stored at the first memory address.

In accordance with a further embodiment of the present disclosure, a method may be provided. The method may include attempting to execute the a first copy of a bootloader stored at the first memory address. The method may further include in the event of a failure to execute the first copy of the bootloader, copying a second copy of the bootloader stored at the second memory address to the first memory address. The method may also include subsequent to copying the second copy to the first memory address, attempting to execute the second copy of the bootloader stored at the first memory address.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
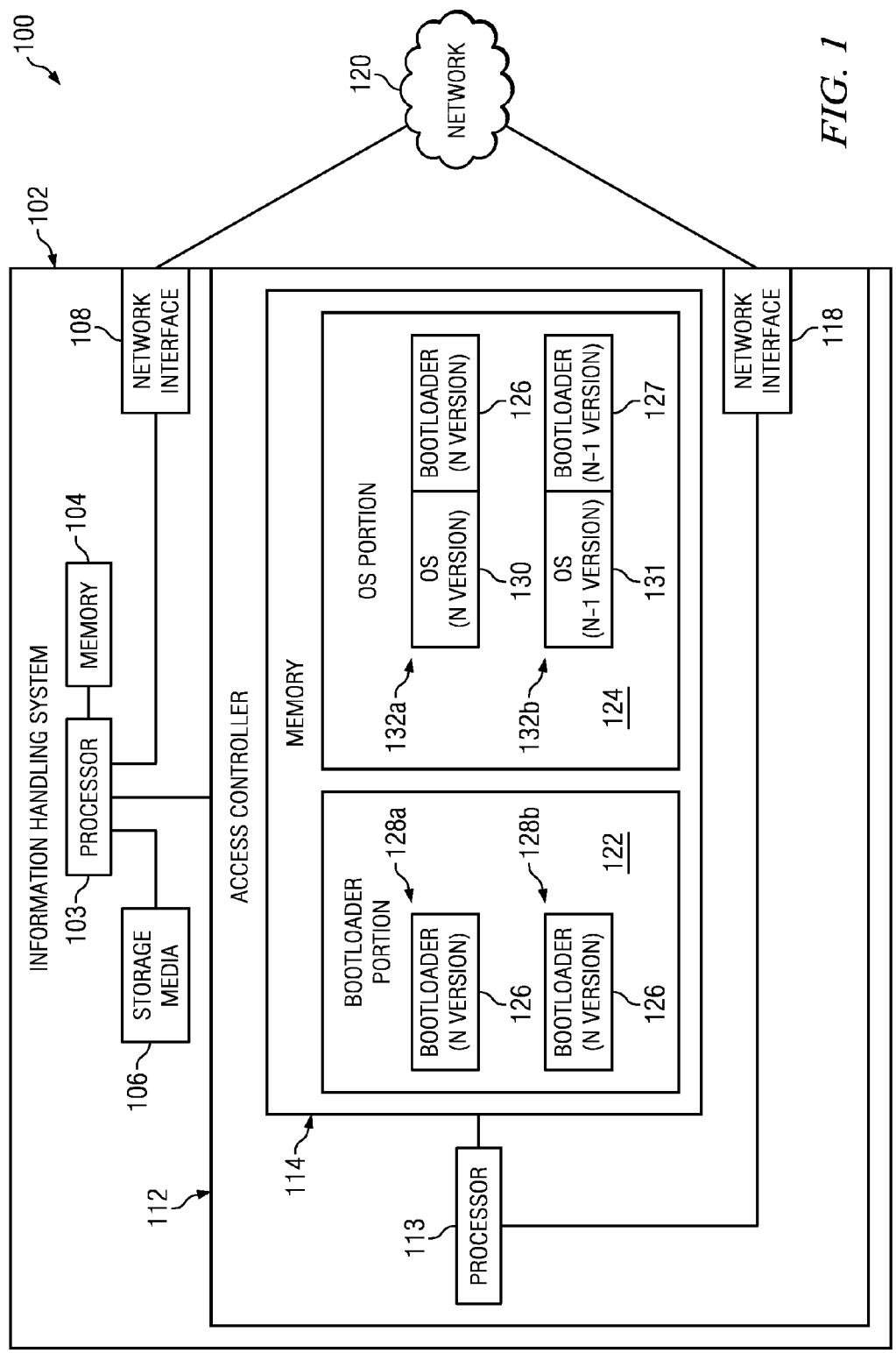
FIG. 1 illustrates a block diagram of an example system including an information handling system having an access controller, in accordance with certain embodiments of the present disclosure.
Figure 2:
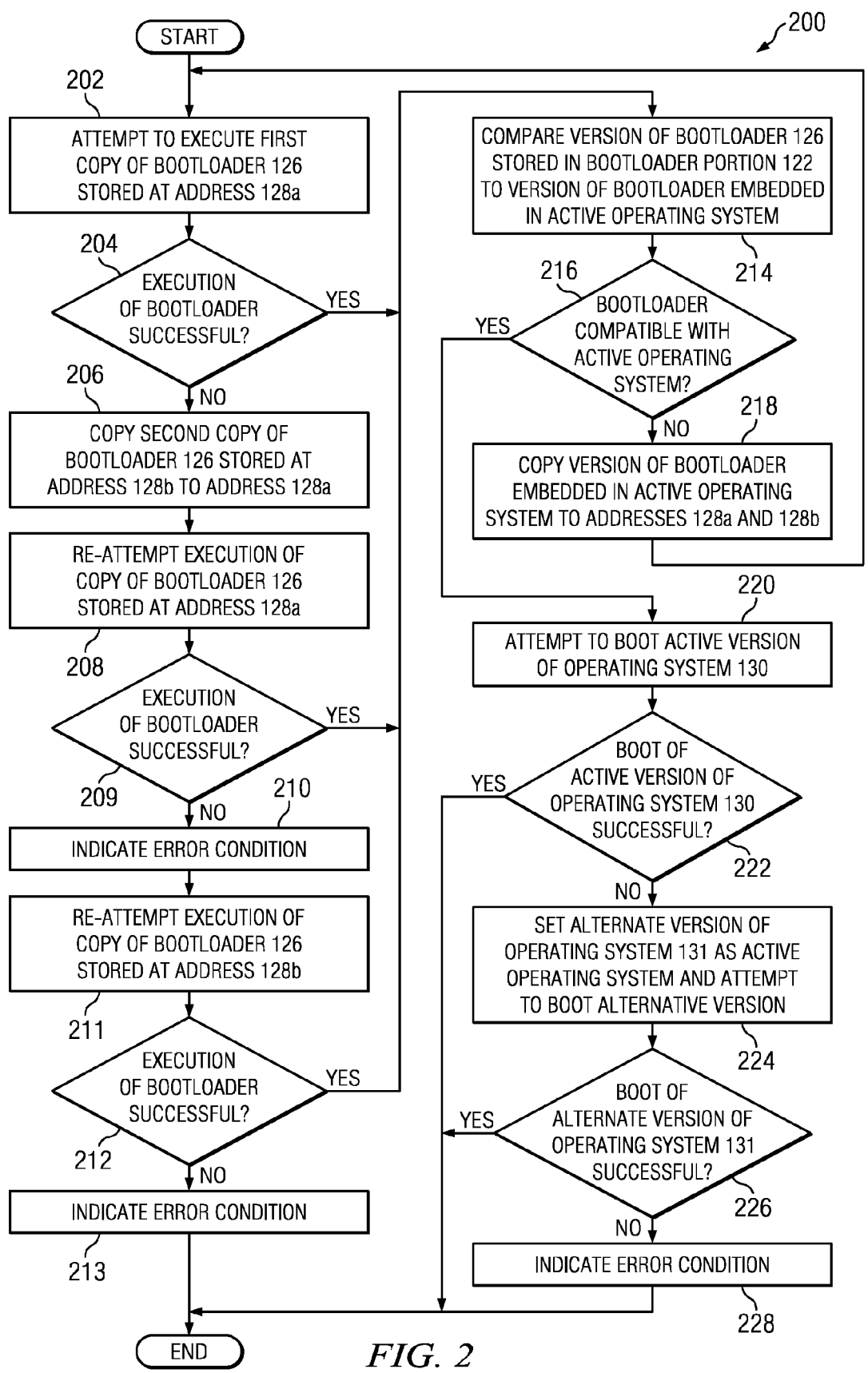
FIG. 2 illustrates a flow chart of an example method for auto-failover and version matching, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 including an information handling system 102 having an access controller 112, in accordance with certain embodiments of the present disclosure. As depicted in FIG. 1, system 100 may include an information handling system 102 and a network 120.

Information handling system 102 may generally be operable to receive data from and/or communicate data to one or more other information handling systems via network 120. In certain embodiments, information handling system 102 may be a server. In another embodiment, information handling system 102 may be a personal computer (e.g., a desktop computer or a portable computer). As depicted in FIG. 1, information handling system 102 may include a processor 103, a memory 104 communicatively coupled to processor 103, a storage media 106 communicatively coupled to processor 103, a network interface 108 communicatively coupled to processor 103, and an access controller 112 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage media 106 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Storage media 106 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 108 may include any suitable system, apparatus, or device operable to serve as an interface between information handling system 102 and network 120. Network interface 108 may enable information handling system 102 to communicate over network 120 using any suitable transmission protocol and/or standard, including without limitation all transmission protocols and/or standards enumerated below with respect to the discussion of network 120. In certain embodiments, network interface 108 may be configured with hardware, software, and/or firmware to allow its associated information handling system 102 to remotely boot from a computer-readable medium remote from information handling system 102 (e.g., a computer-readable medium coupled to network interface 108 via network 120).

Access controller 112 may be any system, device, or apparatus configured to permit an administrator or other person to remotely monitor and/or remotely manage information handling system 102 (e.g., via an information handling system remotely connected to information handling system 102 via network 120) regardless of whether information handling system 102 is powered on and/or has an operating system installed thereon. In certain embodiments, access controller 112 may allow for "out-of-band" control of information handling system 102, such that communications to and from access controller 112 are communicated via a management channel physically isolated from an "in band" communication channel with network interface 108. Thus, for example, if a failure occurs in information handling system 102 that prevents an administrator from remotely accessing information handling system 102 via network interface 108 (e.g., operating system failure, power failure, etc.), the administrator may still be able to monitor and/or manage the information handling system 102 (e.g., to diagnose problems that may have caused failure) via access controller 112. In the same or alternative embodiments, access controller 112 may allow an administrator to remotely manage one or parameters associated with operation of information handling system 102 (e.g., power usage, processor allocation, memory allocation, security privileges, etc.). In certain embodiments, access controller 112 may include or may be an integral part of a baseband management controller (BMC), Dell Remote Access Controller (DRAC) or an Integrated Dell Remote Access Controller (iDRAC).

As depicted in FIG. 1, access controller 112 may include a processor 113, a memory 114 communicatively coupled to processor 113, and a network interface 118 communicatively coupled to processor 113.

Processor 113 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102. In some embodiments, processor 113 may be similar to processor 103. In other embodiments, processor 113 may be configured specifically for operation with access controller 112.

Memory 114 may be communicatively coupled to processor 113 and may include any system, device, or apparatus configured to retain program instructions and/or data for a period of time (e.g., computer-readable media). Memory 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In certain embodiments, memory 114 may store firmware that includes executable instructions to govern operation of access controller 112.

As depicted in FIG. 1, memory 114 may include bootloader portion 122 and operating system portion 124. Bootloader portion 122 may include a copy of a bootloader 126 at an address 128a of bootloader portion 122 and a redundant copy of bootloader 126 at an address 128b of bootloader portion 122. Bootloader 126 may be a sequence of instructions configured to, when executed by processor 113, boot an operating system 130 or 131 and/or initialize components of access controller 112 and/or information handling system 102 for interoperability with operating system 130 or 131. In normal operating conditions, the version of both copies of bootloader 126 stored in bootloader portion 122 of memory may be the "N version" of bootloader 126 corresponding to (e.g., compatible with) the intended, active version (e.g., the "N version") of operating system 130 (e.g., as indicated by a variable set in a Master Boot Record (MBR) of access controller 112).

Operating system portion 124 of memory 114 may include a copy of the intended version (e.g., the "N version") of operating system 130 at an address 132b and a copy of a version of the operating system 131 previous to the intended version (e.g., the "N−1 version"). Each operating system version 130, 131 may have a partition including a bootloader version corresponding to the version of the operating system 130, 131. For example, N version of operating system 130 may include a partition having N version of bootloader 126 and N−1 version of operating system 131 may include a partition having N−1 version of bootloader 127.

Bootloader portion 122 and operating system 124 may comprise different physical locations of memory 114 and/or may comprise different types of memory. For example, in some embodiments, bootloader portion 122 may comprise Serial Peripheral Interface (SPI) memory while operating system portion 124 may comprise Flash memory.

Network interface 118 may include any suitable system, apparatus, or device operable to serve as an interface between access controller 112 and network 120. Network interface 118 may enable access controller 102 to communicate over network 120 using any suitable transmission protocol and/or standard, including without limitation all transmission protocols and/or standards enumerated below with respect to the discussion of network 120.

Network 120 may be a network and/or fabric configured to communicatively couple information handling system 102, access controller 112, provisioning server 122, other information handling systems, and/or other networked components to each other. Network 120 may include a communication infrastructure, which provides physical connections, and a management layer, which organizes the physical connections of information handling system 102 and access controller 112. In the same or alternative embodiments, network 120 may allow block I/O services and/or file access services to network-attached computer-readable media.

Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Operation of various components of system 100 may be illustrated by FIG. 2. FIG. 2 illustrates a flow chart of an example method 200 for auto-failover and version matching, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps 202-228 comprising method 200 may depend on the implementation chosen.

At step 202, processor 113 may attempt to execute the first copy of bootloader 126 stored at address 128a of bootloader portion 122 of memory 124. For example, upon powering on and/or restart of access controller 112, processor 113 may execute microcode embedded on or otherwise accessible to processor 113 that causes processor 113 to attempt to execute from address 128a.

At step 204, processor 113 may determine whether execution of the first copy of bootloader 126 was successful. For example, processor 113 may execute microcode embedded on or otherwise accessible to processor 113 that implements a watchdog timer. Bootloader 126 may include an instruction that may indicate successful execution of bootloader 126 by terminating the watchdog timer or setting a variable. Should the watchdog timer expire before indication of successful completion, such expiration may indicate that bootloader 126 did not execute properly (e.g., due to corruption or other reason). If execution of bootloader 126 is successful, method 200 may proceed to step 214. Otherwise, method 200 may proceed to step 206.

At step 206, processor 113 may copy the second copy of bootloader 126 stored at address 128b to address 128a. Such copying of the second copy of bootloader 126 to address 128a may repair a corrupted or otherwise failed first copy stored in address 128a.

At step 208, processor 113 may again attempt to execute the copy of the bootloader 126 stored at address 128a, which may now include the version of bootloader copied from address 128b.

At step 209, processor 113 may again determine whether execution of the copy of bootloader 126 stored at address 128a is successful. Such determination may again be based on a watchdog timer identical or similar to that of step 204. If execution of bootloader 126 is successful, method 200 may proceed to step 214. Otherwise, method 200 may proceed to step 210.

At step 210, in response to a failure to execute both copies of bootloader 126, processor 113 may indicate an error condition (e.g., by setting an appropriate variable or flag, communicating a message to an administrator console or management program, etc.) indicating another unsuccessful execution of the bootloader from address 128a. Such second unsuccessful execution may indicate that physical memory hardware including address 128a has experienced a failure, or may indicate corruption of both copies of bootloader 126.

Accordingly, at step 211, processor 113 may attempt to execute the copy of the bootloader 126 stored at address 128b.

At step 212, processor 113 may determine whether execution of the copy of bootloader 126 stored at address 128b is successful. Such determination may again be based on a watchdog timer identical or similar to that of steps 204 and 209. If execution of bootloader 126 is successful, method 200 may proceed to step 214. Otherwise, method 200 may proceed to step 213.

At step 213, in response to a failure to execute both copies of bootloader 126, processor 113 may indicate an error condition (e.g., by setting an appropriate variable or flag, communicating a message to an administrator console or management program, etc.) indicating unsuccessful execution of the bootloader from address 128b. Such unsuccessful execution may indicate that physical memory hardware including addresses 128a and 128b has experienced a failure, or may indicate corruption of both copies of bootloader 126.

At step 214, in response to a successful boot of bootloader 126, bootloader 126 may compare its version to the version of the bootloader 126, 127 embedded in the then-active operating system version 130, 131.

At step 216, based on the comparison, bootloader 126 may determine if it is compatible with the then-active operating system version 130, 131. For example, in some embodiments, bootloader 126 may determine that it is compatible if its version is the same as that of the version of bootloader 126, 127 embedded in the then-active operating system version 130, 131. In other embodiments, bootloader 126 may determine that it is compatible if its version is the same or newer as that of the version of bootloader 126, 127 embedded in the then-active operating system version 130, 131. If bootloader 126 is compatible with the then-active operating system version 130, 131, method 200 may proceed to step 220. Otherwise, method 200 may proceed to step 218.

At step 218, in response to a determination that bootloader 126 is not compatible with the then-active operating system version 130, 131, bootloader 126 may copy the version of bootloader embedded in then-active operating system version to addresses 128a and 128b of bootloader portion 122. After completion of step 218, method 200 may proceed again to step 202.

At step 220, in response to successful execution of bootloader 126, bootloader 126, executing on processor 113, may attempt to boot an intended, active version of operating system 130. For example, bootloader 126 may attempt to boot an operating system version based on information stored in a master boot record (MBR) or other variable of memory 114.

At step 222, bootloader 126 may determine if booting of the active version of operating system 130 is successful. In some embodiments, the determination of whether the active operating system successfully boots may be governed by a watchdog timer (e.g., implemented as part of bootloader 126) or other suitable mechanism). In these and other embodiments, bootloader 126 may attempt to boot the active version of the operating system a particular number of times (e.g., three) before determining the attempt to be unsuccessful. If the active version of operating system 130 successfully boots, access controller 112 may operate in its normal state, and method 200 may end. Otherwise, method 200 may proceed to step 224.

At step 224, in response to an unsuccessful attempt to boot the active version of operating system 130, bootloader 126 may set the alternate version of operating system 131 as the active operating system (e.g., by modifying the master boot record or other suitable mechanism), and then attempt to boot the alternative version 131.

At step 226, bootloader 126 may determine if booting of the alternate version (now active version) of operating system 131 is successful. In some embodiments, the determination of whether the alternate operating system successfully boots may be governed by a watchdog timer (e.g., implemented as part of bootloader 126) or other suitable mechanism). In these and other embodiments, bootloader 126 may attempt to boot the alternate version of the operating system a particular number of times (e.g., three) before determining the attempt to be unsuccessful. If the alternate version of operating system 131 successfully boots, access controller 112 may operate with operating system 131 as its operating system, method 200 may end. Otherwise, method 200 may proceed to step 228.

At step 228, in response to a failure to execute the intended version 130 and alternate version 131 of the operating system, bootloader 126, executing on processor 113, may indicate an error condition (e.g., by setting an appropriate variable or flag, communicating a message to an administrator console or management program, etc.). After completion of step 228, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. For example, in some embodiments, step 208 may be performed before, after, or substantially contemporaneous to step 210.

Method 200 may be implemented using system 100 or any other system operable to implement method 200. In certain embodiments, method 200 may be implemented partially or fully in software and/or firmware embodied in computer-readable media.

Using the methods and systems disclosed herein, problems associated with corruption of bootloaders and operating systems in an access controller, and matching versions of bootloaders and operating systems in an access controller may be reduced or elimination. For example, the methods and systems described provide for redundancy and auto-failover for a bootloader stored on memory of an access controller, thus reducing or eliminating problems associated with bootloader corruption. In addition, the method and systems disclosed ensure version compatibility of a bootloader with the an operating system version the bootloader is to boot.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
a first processor having access to a first memory;
a first network interface, wherein the first memory is remotely accessible to the first processor via the first network interface, and wherein the first network interface allows the first processor to remotely boot from the first memory;
an access controller communicatively coupled to the first processor, the access controller comprising:
a second processor having access to a second memory;
the second memory comprising a bootloader portion, the bootloader portion including a first memory address and a second memory address, wherein the second memory stores instructions executable by the second processor, the instructions, when executed by the second processor, cause the second processor to:
attempt to execute the a first copy of a bootloader stored at the first memory address;
when the first copy of the bootloader fails to execute, copy a second copy of the bootloader stored at the second memory address to the first memory address;
subsequent to execution of the instructions to copy the second copy to the first memory address, attempt to execute the second copy of the bootloader stored at the first memory address; and
when the bootloader is executed by the second processor, the bootloader is configured to:
compare version information of the bootloader to version information of a version of the bootloader embedded in an active version of the operating system stored in the second memory; and
based on the compared version information, determine whether the executing version of the bootloader is compatible with the active version of the operating system.

2. The information handling system of claim 1, wherein the bootloader is configured to:
when the bootloader is successfully executed by the second processor, attempt to boot an active version of an operating system.

3. The information handling system of claim 2, wherein the bootloader is configured to:
when the active version of the operating system fails to execute:
set an alternate version of the operating system as the active version of the operating system; and
attempt to boot the alternate version of the operating system as the active version of the operating system.

4. The information handling system of claim 2, wherein the active version of the operating system is stored in an operating system portion of the second memory, the operating system portion being different from the bootloader portion.

5. The information handling system of claim 1, wherein the bootloader is configured to:
when the bootloader is not compatible with the active version of the operating system:
copy the version of the bootloader embedded in the active version of the operating system to the first address and to the second address; and
execute the version of the bootloader copied to the first address.

6. The information handling system of claim 1, wherein the bootloader configured to determine whether the bootloader is compatible with the active version of the operating system comprises the bootloader configured to execute at least one of:
determine whether a version of the bootloader is identical to the version of the bootloader embedded in the active version of the operating system stored in the second memory; and
determine whether a version of the bootloader is a newer version than the version of the bootloader embedded in the active version of the operating system stored in the second memory.

7. The information handling system of claim 1, wherein the instructions stored in the second memory cause the second processor to:
when the second copy of the bootloader stored at the first memory address fails to execute, attempt to execute the second copy of the bootloader stored at the second memory address.

8. An access controller comprising:
a processor having access to a memory; and
a memory having a bootloader portion and an operating system portion, the bootloader portion including a first memory address and a second memory address, the operating system portion storing an active version of an operating system,
wherein the memory stores instructions executable by the processor, the instructions, when executed by the processor, cause the processor to:
attempt to execute the a first copy of a bootloader stored at the first memory address;
when the first copy of the bootloader fails to execute, copy a second copy of the bootloader stored at the second memory address to the first memory address;
subsequent to execution of the instructions to copy the second copy to the first memory address, attempt to execute the second copy of the bootloader stored at the first memory address; and
when the bootloader is executed by the processor, the bootloader is configured to:
compare version information of the bootloader to version information of a version of the bootloader embedded in the active version of the operating system stored in the operating system portion; and
based on the compared version information, determine whether the executing version of the bootloader is compatible with the active version of the operating system.

9. The access controller of claim 8, wherein the bootloader is configured to:
when successfully executed by the processor, attempt to boot an active version of an operating system.

10. The access controller of claim 9, wherein the bootloader is configured to:
when the active version of the operating system fails to execute:

set an alternate version of the operating system as the active version of the operating system; and attempt to boot the alternate version of the operating system as the active version of the operating system.

11. The access controller of claim 8, wherein the bootloader is configured to when the bootloader is not compatible with the active version of the operating system:

copy the version of the bootloader embedded in the active version of the operating system to the first address and the second address; and execute the version of the bootloader copied to the first address.

12. The access controller of claim 8, wherein the instructions to determine whether the bootloader is compatible with the active version of the operating system comprise instructions to execute at least one of:

determine whether a version of the bootloader is identical to the version of the bootloader embedded in the active version of the operating system stored in the operating system portion; and determine whether a version of the bootloader is a newer version than the version of the bootloader embedded in the active version of the operating system stored in the operating system portion.

13. The access controller of claim 8, further comprising instructions to:

when the second copy of the bootloader stored at the first memory address fails to execute, attempt to execute the second copy of the bootloader stored at the second memory address.

14. An article of manufacture comprising a non-transitory computer-readable storage medium storing instructions, the instructions, when executed by a processor included in an access controller, cause the processor to:

attempt to execute the a first copy of a bootloader stored at a first memory address of a memory included in the access controller;

when the first copy of the bootloader fails to execute, copy a second copy of the bootloader stored at a second memory address of the memory to the first memory address;

subsequent to executing the instructions to copy the second copy to the first memory address, attempt to execute the second copy of the bootloader stored at the first memory address; and when the bootloader is executed, the bootloader is configured to:

compare version information of the bootloader to version information of a version of the bootloader embedded in an active version of the operating system stored in the memory; and based on the compared version information, determine whether the executing version of the bootloader is compatible with the active version of the operating system.

15. The article of manufacture of claim 14, further comprising instructions to:

attempt, by the bootloader when successfully executed by the processor, to boot an active version of an operating system.

16. The article of manufacture of claim 15, further comprising instructions to:

when the active version of the operating system fails to execute:

set an alternate version of the operating system as the active version of the operating system; and attempt to boot the alternate version of the operating system as the active version of the operating system.

17. The article of manufacture of claim 15, wherein the active version of the operating system is stored in an operating system portion of the memory.

18. The article of manufacture of claim 14, further comprising instructions to:

when the bootloader is not compatible with the active version of the operating system:

copy the version of the bootloader embedded in the active version of the operating system to the first address and the second address; and execute the version of the bootloader copied to the first address.

19. The article of manufacture of claim 14, wherein the bootloader configured to determine whether the executing version of the bootloader is compatible with the active version of the operating system comprises the bootloader configured to execute at least one of:

determine whether a version of the bootloader is identical to the version of the bootloader embedded in the active version of the operating system stored in the memory; and determine whether a version of the bootloader is a newer version than the version of the bootloader embedded in the active version of the operating system stored in the memory.

20. The article of manufacture of claim 14, further comprising instructions to:

when the second copy of the bootloader stored at the first memory address fails to execute, attempt to execute the second copy of the bootloader stored at the second memory address.

* * * * *